(12) United States Patent
He et al.

(10) Patent No.: US 10,404,558 B2
(45) Date of Patent: *Sep. 3, 2019

(54) ADAPTIVE ALLOCATION FOR DYNAMIC REPORTING RATES OF LOG EVENTS TO A CENTRAL LOG MANAGEMENT SERVER FROM DISTRIBUTED NODES IN A HIGH VOLUME LOG MANAGEMENT SYSTEM

(71) Applicant: Fortinet, Inc., Sunnyvale, CA (US)

(72) Inventors: Jun He, San Jose, CA (US); Partha Bhattacharya, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,896

(22) Filed: Jun. 6, 2018

(65) Prior Publication Data

US 2018/0375746 A1    Dec. 27, 2018

Related U.S. Application Data

(63) Continuation of application No. 15/277,965, filed on Sep. 27, 2016, now Pat. No. 10,044,578.

(51) Int. Cl.
| | |
|---|---|
| *G06F 15/16* | (2006.01) |
| *H04L 12/26* | (2006.01) |
| *H04L 29/08* | (2006.01) |
| *H04L 29/06* | (2006.01) |
| *G06F 21/55* | (2013.01) |
| *H04L 12/24* | (2006.01) |

(52) U.S. Cl.
CPC .......... *H04L 43/065* (2013.01); *G06F 21/552* (2013.01); *H04L 29/08072* (2013.01); *H04L 41/069* (2013.01); *H04L 41/0681* (2013.01); *H04L 63/1416* (2013.01); *H04L 41/5019* (2013.01)

(58) Field of Classification Search
CPC .......................... H04L 29/08072; H04L 29/06
USPC .................................. 709/220, 224, 226, 228
See application file for complete search history.

(56) References Cited

U.S. PATENT DOCUMENTS

| | | | | | |
|---|---|---|---|---|---|
| 7,391,711 | B2* | 6/2008 | Geile | ...................... | G06F 17/14 370/204 |
| 8,305,895 | B2* | 11/2012 | Chang | ..................... | H04L 47/10 370/230 |
| 10,009,365 | B2* | 6/2018 | Jain | ...................... | H04L 63/0245 |
| 10,044,578 | B2* | 8/2018 | He | ......................... | H04L 43/065 |
| 10,225,288 | B2* | 3/2019 | Haugsnes | ........... | H04L 63/1441 |

(Continued)

*Primary Examiner* — Khanh Q Dinh

(74) *Attorney, Agent, or Firm* — Law Office of Dorian Cartwright; Dorian Cartwright

(57) ABSTRACT

Dynamic reporting rates for a log management system are adaptively allocated. Each individual controller node device of plurality of controller nodes is initially allocated an EPS rate limit for submitting event records to a log management system (e.g., an SIEM log management system) out of a licensed EPS rate. When surges are detected, the log management system dynamically reallocates proportions of EPS rates, within the licensed EPS rate. The individual EPS rate limit for at least one collector node is adjusted in real-time for a specific controller node based on under usage by other collector nodes. Another technique is to prioritize or weight events causing the surge to determine adjustments to EPS rate.

18 Claims, 5 Drawing Sheets

(56) References Cited

U.S. PATENT DOCUMENTS

| | | | |
|---|---|---|---|
| 2007/0195901 A1* | 8/2007 | Geile | G06F 17/14 375/260 |
| 2008/0239955 A1* | 10/2008 | Chang | H04L 47/10 370/232 |
| 2012/0324106 A1* | 12/2012 | Chang | H04L 47/10 709/224 |
| 2016/0294793 A1* | 10/2016 | Larson | H04L 63/0485 |
| 2017/0046629 A1* | 2/2017 | Reinecke | G06F 21/50 |
| 2017/0142148 A1* | 5/2017 | Bu er | G06F 21/552 |

* cited by examiner

ADAPTIVE ALLOCATION FOR DYNAMIC REPORTING RATES OF LOG EVENTS TO A CENTRAL LOG MANAGEMENT SERVER FROM DISTRIBUTED NODES IN A HIGH VOLUME LOG MANAGEMENT SYSTEM

RELATED APPLICATIONS

This application is a continuation of U.S. application Ser. No. 15/277,965, filed on Sep. 27, 2016, which is incorporated herein by reference in its entirety.

FIELD OF THE INVENTION

The invention relates generally to computer networking, and more specifically, to dynamically allocating reporting rates of log events to a central log service from distributed nodes.

BACKGROUND

The field of security information and event management (SIEM) is generally concerned with collecting data from networks and networked devices that reflects network activity and/or operation of the devices, and analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Exemplary networked devices include firewalls, intrusion detection systems, and servers.

One problem with SIEM services concerns the amount and rate at which event records created. Typically, a maximum EPS rate is set by a total licensed EPS (events per second) rate. But certain security events can cause a surge in event records, for example, if each instance of a denial of service attack is reported. As a result, a single network device can max out the licensed EPS rate if uncontrolled. Equally critical events at other network device may be ignored to remain below the licensed EPS rate.

Therefore, what is needed is a robust EPS allocation technique to respond to surges with dynamic reallocation of EPS rates to individual components.

SUMMARY

These shortcomings are addressed by the present disclosure of methods, computer program products, and systems for dynamically allocating reporting rates of log events to a central log service from distributed nodes.

In one embodiment, each individual controller node device of plurality of controller nodes is initially allocated an EPS rate limit for submitting event records to a log management system (e.g., an SIEM log management system) out of a licensed EPS rate. When surges are detected, the log management system dynamically reallocates proportions of EPS rates, within the licensed EPS rate.

In an embodiment, adjustment to the individual EPS rate limit for one or more specific controller nodes based on under usage by other collector nodes in real-time. Another technique is to prioritize or weight events causing the surge to determine adjustments to the individual EPS rate.

Advantageously, log management services are automatically balanced for event surges while remaining in accordance with a licensed EPS rate.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for dynamically allocating reporting rates of log events to a central log service from distributed nodes. For example, SIEM logging rates are adjusted in real-time in response to a specific location of a network outage or security intrusion. One of ordinary skill in the art will recognize that many other scenarios are possible, as discussed in more detail below.

Figure 1:
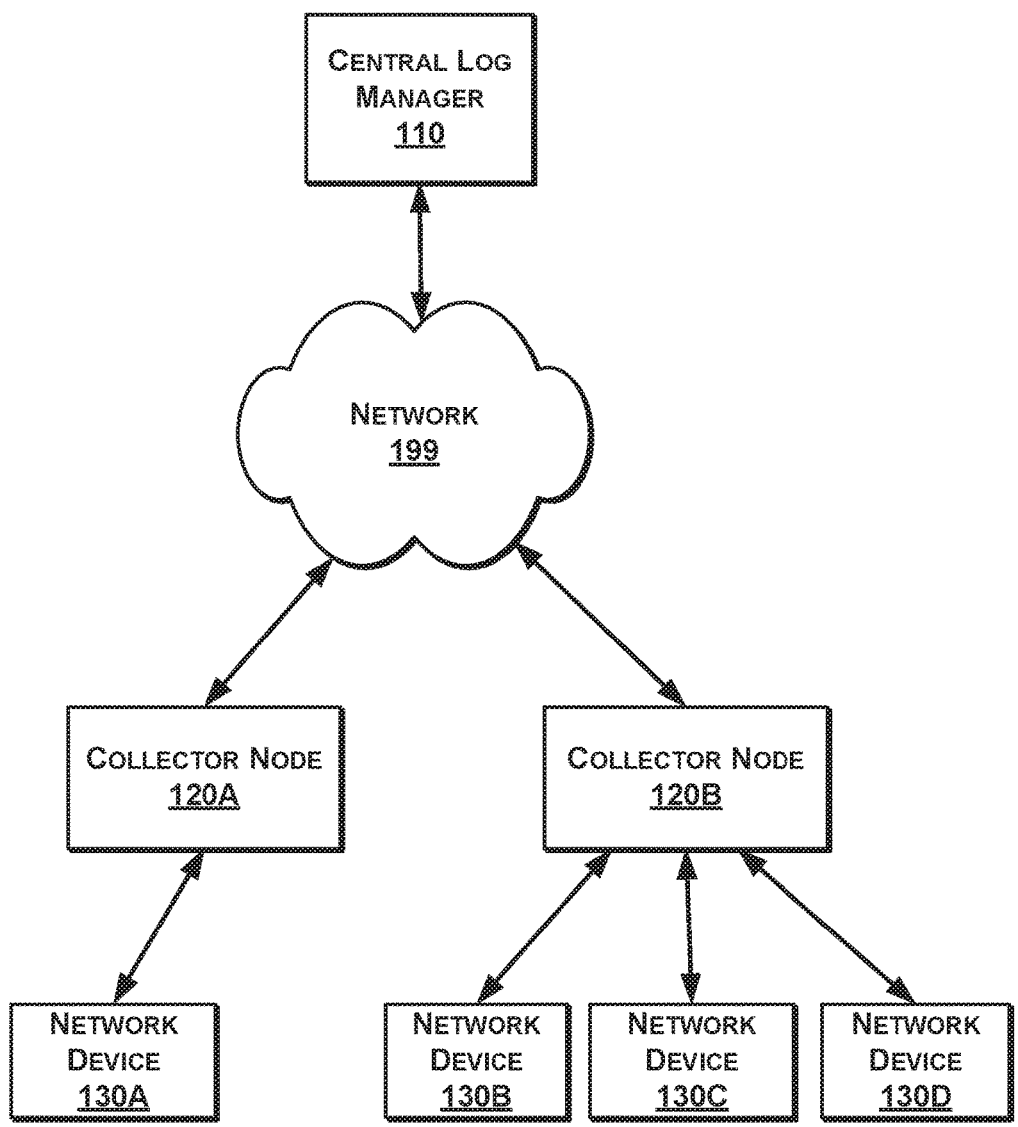
FIG. 1 is a high-level block diagram illustrating a system to dynamically allocate reporting rates of log events to a central log service from distributed nodes, according to one embodiment.
Figure 2:
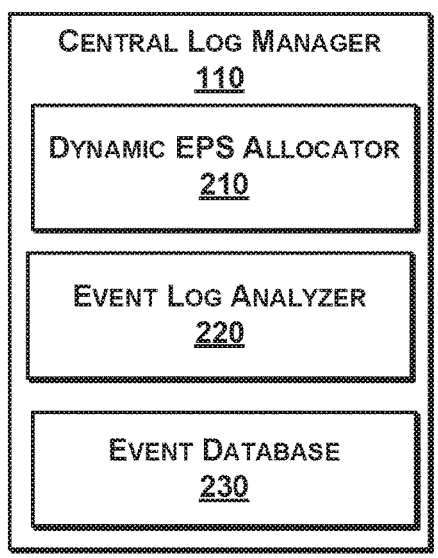
FIGS. 2-3 are more detailed block diagrams illustrating internal components of a central log manager and a collector node from the system of FIG. 1, according to some embodiments.
Figure 3:
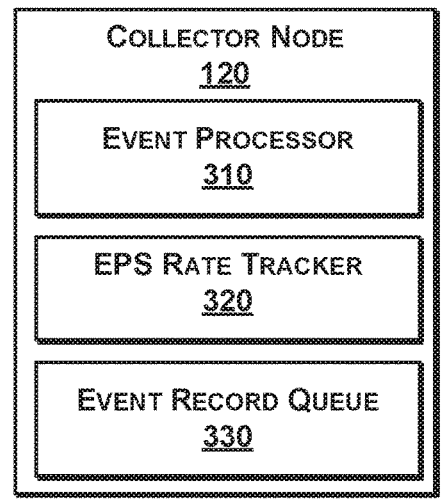

Systems to Dynamically Allocate Reporting Rates of Log Events (FIGS. 1-3)

FIG. 1 is a high-level block diagram illustrating a system 100 to dynamically allocating reporting rates of log events to a central log service from distributed nodes, according to one embodiment. The system 100 comprises a central log manager 110, collector nodes 120A-B, and network devices 130A-D.

In a preferred embodiment, the network device 130A is coupled to the collector node 120A and the network devices 130B-D are coupled to the collector node 120B, through wired or wireless channels. In, turn, the collector nodes 120A-B are coupled to the WAN 199 preferably through a wired connection, but can be wireless. The central log manager 110 is also coupled to the WAN 199, preferably through a wired connection. Additional network components can also be part of the system 100, such as firewalls, virus scanners, routers, switches, application servers, databases, and the like.

The central log manager 110 generally analyzes and stores event records received from collection nodes 120A-B. Submission rates for event records by individual collector nodes 120A-B, sometimes measured in EPS, are allocated and adjusted as needed. An initial allocation is distributed to collector nodes 120A-B corresponding to a licensed EPS rate. In some embodiments, the central log manager 110 is a subscription operated by a third party from the network devices 130A-D, and EPS rate is limited by subscription or SLA (service level agreement) terms. In other embodiments, the central log manager 110 has limitations on bandwidth, processing power, or storage capacity that limits an incoming EPS rate that can be handled. Manual EPS rate limits can also be enforced. The central log manager 110 can be a FortiSIEM device by Fortinet, Inc. of Sunnyvale, Calif., in one embodiment. Additional example embodiments of the central log manager 110 are discussed below in relation to FIG. 2.

The collector nodes 120A-B are geographically dispersed data collectors that are located proximate to the underlying network devices 130A-D. The collector nodes 120A-B can be connected to the network devices 130A-D on a LAN, or the collector nodes 120A-B can be cloud-based or otherwise exist outside of a firewall on a LAN. The collector nodes 120A-B can be on a common LAN or on different LANs. In some aspects, events are pushed to the collector nodes 120A-B. In other aspects, the collect nodes 120A-B are notified by other devices of errors, such as by a wireless station attempting to connect. In another aspect, the collector nodes 120A-B perform test transactions against the network devices 130A-D and report errors in event records.

In the example of FIG. 1, collector node 120A services one network device while collector node 120B has a higher device count of three network devices. If event reporting is equal from the network devices 130A-D, network node 120B should have a higher EPS rate need. On the other hand, the network device 130A could be a gateway that generates lots of event records while network devices 130B-D are rarely used, non-critical devices that create less event reporting than a single device. Many variations are possible.

The network devices 130A-D can be, for example, a gateway device, a firewall, an access point, a switch a router, a hub, a repeater, a server, a controller, a wireless station, or any other device on the network 199 or within a LAN. The network devices 130A-D can be implemented in a personal computer, a laptop computer, a tablet computer, a smart phone, a mobile computing device, a server, a cloud-based device, a virtual device, an Internet appliance, or any of the computing devices described herein (see e.g., FIG. 6). No client configuration or download is needed for this particular technique, although other aspects of log management may require downloads to the network devices 130A-D. For instance, an operating system patch or separate application can detect error events through intercepting messages, and collect data for sending to the collector nodes 120A-B.

Figure 6:
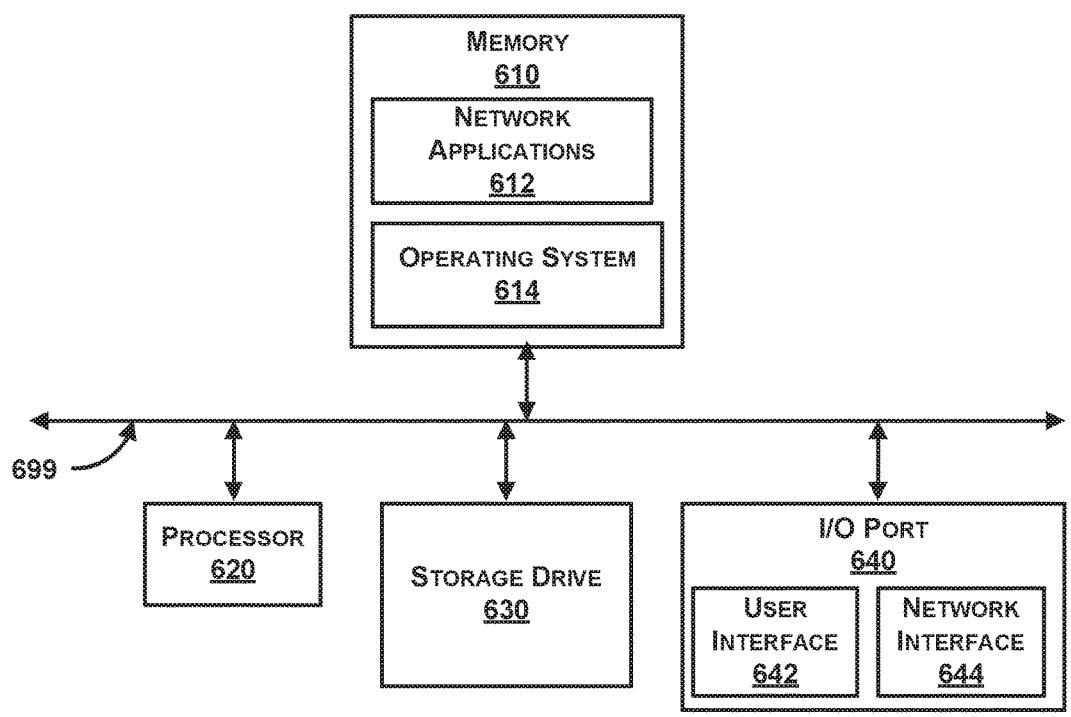
FIG. 6 is a block diagram illustrating an example computing device, according to one embodiment.

The network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating the central log manager 110 of the system 100, according to one embodiment. The central log manager 110 comprises a dynamic EPS allocator 210, an event log analyzer 220, and an event database 230. The components can be implemented in hardware, software, or a combination of both.

The dynamic EPS allocator 210 initially allocates EPS rates to collector nodes 120A-B and makes EPS rate adjustments on an as-needed basis, in an embodiment. Various algorithms can be implemented. One implementation calculates a ratio of each individual collector node need to the overall need. The result can be an assignment of average needs if the licensed EPS rate equals a sum of individual average EPS rates. The result can also be an assignment below or above needs, at the same relative proportions.

Responsive to surges, the dynamic EPS allocator 210 recalculates allocations. New allocations can be based on under usage of assigned EPS rates, the nature of surge events (e.g., compare priorities of underlying event records), manual reallocations, and service level agreements (SLAs), for example. New allocations can be specified for a particular event or a particular network device with respect to reporting one of the collector nodes 120A-B or with respect to the same reports to more than one of the collector nodes 120A-B. Additionally, a maximum EPS rate can be changed by adjusting the overall licensed EPS rate.

The event log analyzer 220 receives event records from the collector nodes 120A-B per assigned EPS rates. In one case, incoming event records are categorized so that network administrators are immediately aware of sensitive events and are insulated from repetitive data about events that have negligible effects on network operations. In another case, existing event records are periodically purged from the events database 230 using an SIEM purge policy. Events can also be moved from online storage to offline storage. Event reporting and remediation for events can also be initiated from the event log analyzer 220 along with many other configurable tasks.

The event database 230 stores processed records in a table or a relational database that is searchable with queries. In one embodiment, the event database 230 is an external online resource, and in another embodiment, is a combination of online and offline records. The database 230 can be subject to online storage processes, including data compression, data security, and data mirroring.

FIG. 3 is a more detailed block diagram illustrating a collector node 120 (collectively representing the collector nodes 120A-B) of the system 100, according to one embodiment. The collector node 120 comprises an event processor 310, an EPS rate tracker 320, and an event record queue 330. The components can be implemented in hardware, software, or a combination of both. The internal components can be implemented in hardware, software, or a combination of both.

The event processor 310 generates event records from data submitted by the network devices 130A-D. The EPS rate tracker 320 calculates EPS rate usage, average EPS rate usage for a period of time, and over and under usage. Notifications sent by the EPS rate tracker 320 detail EPS rate usages and needs. The event record queue 330 stores event records when the allocated EPS rate has been surpassed or reaches a trigger level. When the EPS rate usage drops below an allocated level, the event record queue 330 is released in a first in first out (FIFO) order or a priority based order. Nearly reaching a queue capacity can also trigger an EPS rate adjustment request.

Figure 4:
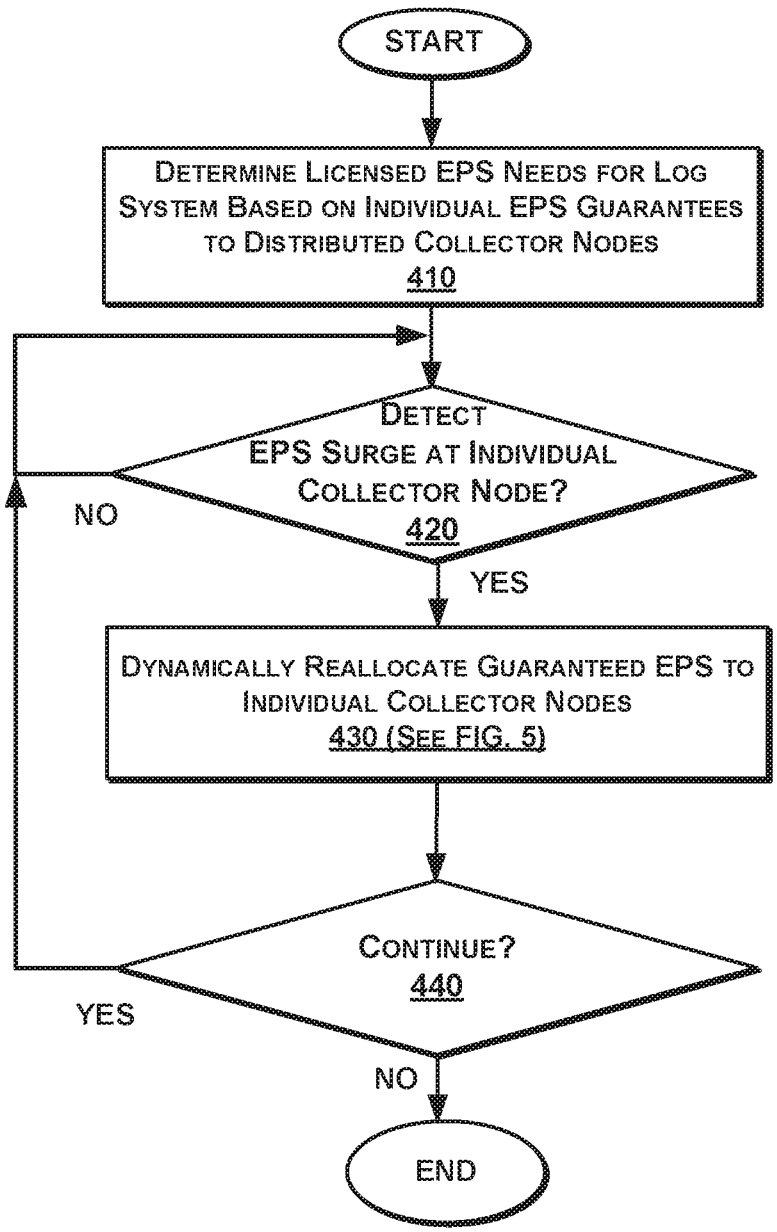
FIG. 4 is a high-level flow diagram illustrating a method for responding to EPS surges at collector nodes, according to one embodiment.
Figure 5:
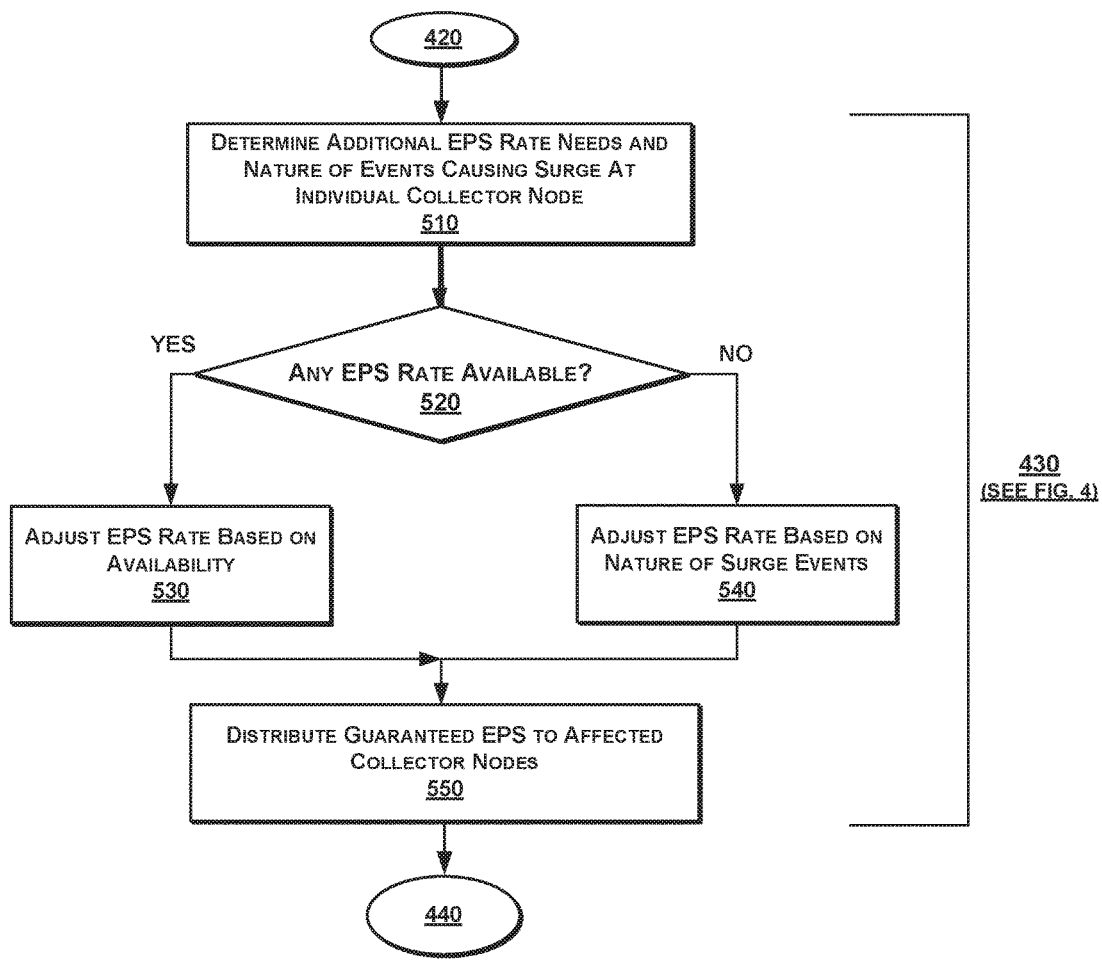
FIG. 5 is a more detailed flow diagram illustrating a step of dynamically allocating reporting rates of log events to a central log service from distributed nodes from the method of FIG. 4, according to one embodiment.

Methods for Dynamically Allocating Reporting Rates of Log Events (FIGS. 4-5)

FIG. 4 is a high-level flow diagram illustrating a method 400 for responding to EPS surges at collector nodes, according to one embodiment. The method 400 can be implemented by the system 100 of FIG. 1 or a different system. One of ordinary skill in the art will recognize that the method 400 is non-limiting as other embodiments can have more or less steps and can be performed in a different order.

Licensed EPS rate needs for a log system are determined based on individual EPS rate guarantees to distributed collector nodes (step 410). A sum of individual EPS rates averaged over a period (e.g., an hour or a day). An EPS rate surge is detected at one or more individual collector nodes (step 420). In one case, surges are measured by a sliding window averaging the last hour of transactions. In another case, a large variance to the rolling average can react to events even faster. Guaranteed individual EPS rates are dynamically allocated to individual collector nodes (step 430), as detailed in FIG. 5. The process continues (step 440) to detect EPS surges at collector nodes until disrupted.

FIG. 5 is a more detailed flow diagram illustrating the step 430 of dynamically reallocating reporting rates of log events to a central log service from distributed nodes from FIG. 4, according to one embodiment.

Additional individual EPS rate needs and nature of events causing EPS rate surge at a specific collector node are determined (step 510). One calculation compares recent EPS rates to historical EPS rates to identify shortage. It is determined whether any additional EPS rate is available (step 520). If so, EPS rate is adjusted based on availability calculations (step 530). One source is under usage of EPS rate at individual collector nodes. For example, if an average EPS rate falls below guaranteed EPS rate for a previous period of time, the guaranteed EPS rate can be adjusted down closer to actual usage. One embodiment predicts upcoming usage and adjusts down based on an estimated reduced need. Still another embodiment adjusts EPS rates based on time sharing to give different collector nodes rotating allocations. An additional embodiment responds to each request with a temporary adjustment, or continually adjusts based on each request until an equilibrium is reached.

If no EPS rate is readily available, EPS rates are adjusted based on surge events (step 540). In more detail, characteristics of surge events are identified and a priority algorithm compares a priority of addressing the surge events against a priority of other network activities. In operation, outage of a critical server is given more weight than slow streaming of an online music service. Specific events can automatically trigger reallocations (e.g., a prolonged, active security attack, or an attack to a specific component). Either way, the adjusted individual EPS rates are distributed to collector nodes (step 550).

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the central log manager 110, the collector nodes 120, and the network devices 130A-D. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the central log manager 110, the collector nodes 120, and the network devices 130A-D, as illustrated in FIGS. 1-3. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for a log management server on a data communication network for dynamically adjusting limits for distributed controller node devices with respect to a rate of event reporting, the method comprising:
    initially allocating each controller node device of plurality of controller nodes a limit for an event reporting rate, wherein a sum of limits for event reporting rate for the plurality of controller nodes device does not exceed a licensed event reporting rate;
    detecting a surge in events at one or more controller node devices;
    dynamically reallocating a limit for an event reporting rate for the one or more controller node devices, wherein the sum of limits for event reporting rate for the plurality of controller node devices continues to not exceed the licensed event reporting rate,
    wherein the event reporting rate limit is adjusted for the controller node at least in part based on an amount of availability of additional event reporting capacity for the licensed event reporting rate, and, responsive to approaching the licensed event reporting rate, the event reporting rate limit is adjusted for the one or more controller node at least in part based on the event type statistics;
    notifying the controller node of the adjusted event reporting rate limit; and
    receiving event reports over a certain duration of time in compliance with the adjusted event reporting rate limit.

2. The method of claim 1, further comprising:
    receiving statistics describing types of events occurring in the events surge,
    wherein the dynamic reallocation is responsive to an amount of the surge and the event type statistics.

3. The method of claim 1, further comprising:
    setting the licensed event reporting rate to surpass a sum of the initial limit allocations for each controller node device.

4. The method of claim 1, further comprising:
    offsetting a difference between the adjusted event reporting rate and the event reporting rate as initially allocated, with an adjustment to at least one other controller node device, such that the sum of limits for event reporting rate for the plurality of controller node devices continues to not exceed the licensed event reporting rate.

5. The method of claim 1, wherein the limit of the event reporting rate is rate at which the log management server guarantees a specific controller node to process events.

6. The method of claim 1, wherein dynamically adjusting the event reporting limit for the controller node device comprises:
    temporarily adjusting the event reporting limit for the controller node device until at least one of: a predetermined time limit expires and the event reporting rate drops.

7. The method of claim 1, further comprising:
    storing events reported from the plurality of controller node devices.

8. The method of claim 1, further comprising:
    responding to queries on a database of stored events reported from the plurality of controller node devices.

9. The method of claim 1, further comprising:
    storing events in a local queue to maintain the event reporting rate with delays to event reporting.

10. The method of claim 1, wherein detecting the surge in events further comprises:
    detecting a predetermined amount of events being stored in a local queue of the controller node device.

11. The method of claim 1, wherein at least one access point from the data communication network initiates events reported by the control node device.

12. The method of claim 1, wherein the sure is caused by events reported in association with at least one of: misconfiguration of a firewall, a denial of service attack, a compromised network component, and a time of day.

13. The method of claim 1, further comprising at least one of:
    setting an EPS rate for a specific event type; and
    setting an EPS rate for a specific network device.

14. The method of claim 1, further comprising:
    increasing the licensed EPS rate.

15. The method of claim 1, wherein the event reporting rate is measured as EPS (events per second).

16. The method of claim 1, wherein the log management server comprises an SIEM (security information and event management) server.

17. A non-transitory computer-readable medium to, when executed by a processor, perform a computer-implemented method in a log management server on a data communication network for dynamically adjusting limits for distributed controller node devices with respect to a rate of event reporting, the method comprising:
    initially allocating each controller node device of plurality of controller nodes a limit for an event reporting rate, wherein a sum of limits for event reporting rate for the plurality of controller nodes device does not exceed a licensed event reporting rate;
    detecting a surge in events at one or more controller node devices;
    dynamically reallocating a limit for an event reporting rate for the one or more controller node devices, wherein the sum of limits for event reporting rate for the plurality of controller node devices continues to not exceed the licensed event reporting rate,
    wherein the event reporting rate limit is adjusted for the controller node at least in part based on amount of availability of additional event reporting capacity for the licensed event reporting rate, and, responsive to approaching the licensed event reporting rate, the event reporting rate limit is adjusted for the one or more controller node at least in part based on the event type statistics;

notifying the controller node of the adjusted event reporting rate limit; and receiving event reports over a certain duration of time in compliance with the adjusted event reporting rate limit.

18. A log management server on a data communication network for dynamically adjusting limits for distributed controller node devices with respect to a rate of event reporting, the log management server comprising:

a processor; and a memory, storing:

a dynamic EPS allocator to initially allocate each controller node device of plurality of controller nodes a limit for an event reporting rate;

an event log analyzer to detect a surge in events at a controller node device, and receive statistics describing types of events occurring in the events surge;

wherein the dynamic EPS allocator dynamically reallocates a limit for an event reporting rate for the controller node device, wherein the sum of limits for event reporting rate for the plurality of controller node devices continues to not exceed the licensed event reporting rate, wherein the event reporting rate limit is adjusted for the controller node at least in part based on amount of availability of additional event reporting capacity for the licensed event reporting rate, and, responsive to approaching the licensed event reporting rate, the event reporting rate limit is adjusted for the controller node at least in part based on the event type statistics, wherein the dynamic EPS allocator notifies the controller node of the adjusted event reporting rate limit, wherein the event log analyzer receives event reports over a certain duration of time in compliance with the adjusted event reporting rate limit.

* * * * *